United States Patent
Norkin et al.

(10) Patent No.: US 9,565,436 B2
(45) Date of Patent: Feb. 7, 2017

(54) METHOD FOR FILTER CONTROL AND A FILTERING CONTROL DEVICE

(75) Inventors: Andrey Norkin, Solna (SE); Kenneth Andersson, Gävle (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 470 days.

(21) Appl. No.: 13/979,495

(22) PCT Filed: Dec. 21, 2011

(86) PCT No.: PCT/SE2011/051563
§ 371 (c)(1),
(2), (4) Date: Jul. 12, 2013

(87) PCT Pub. No.: WO2012/096614
PCT Pub. Date: Jul. 19, 2012

(65) Prior Publication Data
US 2013/0294525 A1    Nov. 7, 2013

Related U.S. Application Data

(60) Provisional application No. 61/432,883, filed on Jan. 14, 2011.

(51) Int. Cl.
*H04N 7/12*    (2006.01)
*H04N 11/02*    (2006.01)
(Continued)

(52) U.S. Cl.
CPC ...... *H04N 19/00945* (2013.01); *H04N 19/117* (2014.11); *H04N 19/157* (2014.11);
(Continued)

(58) Field of Classification Search
CPC  H04N 19/00945; H04N 19/46; H04N 19/157; H04N 19/90; H04N 19/176; H04N 19/117; H04N 19/86
See application file for complete search history.

(56) References Cited

U.S. PATENT DOCUMENTS

2006/0098744 A1*    5/2006    Huang ............... H04B 1/66
375/240.29

OTHER PUBLICATIONS

Seung-Ho Shin,Kyu-HoPark,Young-JoonChai,Tae-YongKim, "Variable block-baseddeblockingfilterforH.264/AVConlow-end and low-bit rates terminals", SignalProcessing: Image Communication, 25 (2010)255-267.*
(Continued)

*Primary Examiner* — Sath V Perungavoor
*Assistant Examiner* — Xiaolan Xu
(74) *Attorney, Agent, or Firm* — Murphy, Bilak & Homiller, PLLC

(57) ABSTRACT

Current deblocking filters are using the same filters with the same filtering strength irrespective of the block size and the size of the transform used. However, in the new video coding standards such as emerging HEVC the PU sizes can vary from 4 to 64 and the TU sizes can vary from 4 to 32. Therefore, filtering the same amount of pixels (e.g. two or three) from the block boundary for the block of size 4 can be excessive, while for the block size 32 it may not be enough, with the result that the boundary between two blocks is still visible. Hence, there is a need for an efficient deblocking filter control that can be used to reduce blocking artifacts at block boundaries and that does not have the above mentioned drawbacks. It is a general objective to provide an efficient deblocking filter control. Thus, the objective is solved by applying different filters for different block sizes such as CU, PU or/and TU sizes. Accordingly, the deblocking filtering strength is adjusted based on the block size, which implies that the amount of modification applied to pixels by the deblocking filter is varied depending (Continued)

on the block size. The amount of modification that is being varied is in one embodiment the number of pixels to be modified.

27 Claims, 12 Drawing Sheets

(51) Int. Cl.
    *H04N 19/90*     (2014.01)
    *H04N 19/176*     (2014.01)
    *H04N 19/46*     (2014.01)
    *H04N 19/117*     (2014.01)
    *H04N 19/157*     (2014.01)
    *H04N 19/86*     (2014.01)

(52) U.S. Cl.
    CPC ........... *H04N 19/176* (2014.11); *H04N 19/46* (2014.11); *H04N 19/86* (2014.11); *H04N 19/90* (2014.11)

(56) References Cited

OTHER PUBLICATIONS

Norkin, A. et al. "Development of HEVC Deblocking Filter." Joint Collaborative Team on Video Coding (JCT-VC) of ITU-T SG16 WP3 and ISO/IEC JTC1/SC29/WG11, Document: JCTVC-D377, 4th Meeting, Daego, Korea, Jan. 20-28, 2011.

Shin-S.-H., et al. "Variable Block-Based Deblocking Filter for H.264/AVC on Low-End and Low-Bit Rates Terminals."Signal Processing: Image Communication, vol. 25, Issue 4, pp. 255-267, Apr. 2010.

Author Unknown. "Test Model under Consideration." Joint Collaborative Team on Video Coding (JCT-VC) of ITU-T SG16 WP3 and ISO/IEC JTC1/SC29/WG11, Document: JCTVC-B205, 2nd Meeting, Geneva, Switzerland, Jul. 21-28, 2010.

List, Peter et al., "Adaptive Deblocking Filter", IEEE Transactions on Circuits and Systems for Video Technology, vol. 13, Issue 7, Jul. 2003, 614-619.

\* cited by examiner

METHOD FOR FILTER CONTROL AND A FILTERING CONTROL DEVICE

TECHNICAL FIELD

The present embodiments generally relate to filtering control and in particular to controlling deblocking filtering over block boundaries in a video frame.

BACKGROUND

Deblocking filters are used in the video coding standards in order to combat blocking artifacts. The blocking artifacts arise because the original video frames are split into blocks which are processed relatively independently. The blocking artifacts can, for instance, arise due to different intra predictions of the blocks, quantization effects and motion compensation. Two particular variants of deblocking are described below.

In state of the art video coding, such as H.264, there is a deblocking filter, also denoted loop filter, after prediction and residual reconstruction, but before storage of the reconstruction for later reference when encoding or decoding the subsequent frames. The deblocking filtering consists of several steps such as filter decisions, filtering operations, a clipping function and change of pixel values. The decision to filter the boundary or not is made based on evaluation of several conditions. Filter decisions depend on macroblock (MB) type, motion vector (MV) difference between neighboring blocks, whether neighboring blocks have coded residuals and on the local structure of the current and/or neighboring blocks.

Then the amount of filtering for a pixel depends, among others, on the position of that pixel relative to the block border or boundary and on the quantization parameter (QP) value used for residual coding.

The filter decision is based on comparing three pixel differences with three thresholds. The thresholds are adapted to the quantization parameter (QP). For instance, assume a vertical block boundary of $$abcd|efgh$$

where a, b c and d denote the pixel values of the pixels of a row of pixels in the current block with e, f, g and h denoting the corresponding pixel values of the pixels of a corresponding row of pixels in the neighboring block. If the following conditions are fulfilled the filter decision is positive, e.g. abs(d−e)<thr1, abs(c−d)<thr2, and abs(e−f)<thr2, where thr1 and thr2 are adapted based on QP.

There are two filtering modes in H.264. In the first filtering mode, referred to as normal filtering, filtering can be described with a delta value with which filtering changes the current value with. The filtering for the pixels closest to the block boundary is d'=d+delta and e'=e−delta, where delta has been clipped off to a threshold±thr3 to a value that is constrained by the QP. More filtering is thereby allowed for high QP than for low QP. Clipping can be described as delta_clipped=max(−thr3, min(thr3, delta)), where thr3 is controlling the filter strength. A larger value of thr3 means that the filtering is stronger which means that a stronger low-pass filtering effect will happen.

The filter strength can be increased if any of the following two conditions also holds, e.g. abs(b−d)<thr2 and abs(e−g)<thr2. The filter strength is adapted by clipping the delta less, e.g. allow for more variation.

The second filtering mode, referred to as strong filtering, is applied for intra macroblock boundaries only, when the following condition is fulfilled abs(d−e)<thr1/4.

For more information of deblocking filtering in H.264 reference is made to List et al., Adaptive Deblocking Filter, *IEEE Transactions on Circuits and Systems for Video Technology*, vol. 13, no. 7, July 2003.

In the draft HEVC (High Efficiency Video Coding) specification "Test Model under Consideration", ITU-T SG16 WP3 document, JCTVC-B205, Chapter 6.5 In-loop filter process, the deblocking filter works differently from H.264. The filtering is performed if at least one of the blocks on the side of the boundary is intra, or has non-zero coefficients, or the difference between the motion vector components of the blocks is greater or equal to one integer pixel. For example, when filtering the border between the blocks with a vertical block boundary of $$p3_i p2_i p1_i p0_i | q0_i q1_i q2_i q3_i$$

with $pj_i$ denoting the pixel value of pixel number j of row number i in the current block and $qj_i$ denoting the pixel value of pixel number j of row number i in the neighboring block, i=0 . . . 7, j=0 . . . 3, then the following condition should also be satisfied:

$$d=|p2_2-2\times p1_2+p0_2|+|q2_2-2\times q1_2+q0_2|+|p2_5-2\times p1_5+p0_5|+|q2_5-2\times q1_5+q0_5|\beta$$

where β depends on QP. In the above mentioned HEVC specification, there is a table of β, where β increases with QP.

If the conditions are fulfilled and filtering is done between the current block and the neighboring block, one of two types of filtering is performed, referred to as weak and strong filtering, respectively. The choice between the strong and the weak filtering is done separately for each line depending on the following conditions. For each line i= 0 . . . 7, the strong filtering is performed if all the following conditions are true, otherwise, weak filtering is performed:

$$d<(\beta>>2)$$

$$(|p3_i-p0_i|+|q0_i-q3_i|)<(\beta>>3)$$

$$|p0_i-q0_i|<((5\times t_C+1)>>1)$$

where $t_C$ and β depend on QP and >> denotes a right shift operator.

Weak filtering is performed based on the above conditions. The actual filtering works by computing an offset (Δ), adding it to the original pixel value and clip the sum to a filtered output pixel value in the range of 0-255:

$$\Delta=\text{Clip}(-t_C,t_C,(13\times(q0_i-p0_i)+4\times(q1_i-p1_i)-5\times(q2_i-p2_i)+16)>>5))$$

$$p0_i=\text{Clip}_{0-255}(p0_i+\Delta)$$

$$q0_i=\text{Clip}_{0-255}(q0_i-\Delta)$$

$$p1_i=\text{Clip}_{0-255}(p1_i+\Delta/2)$$

$$q1_i=\text{Clip}_{0-255}(q1_i-\Delta/2)$$

where the clip function Clip(A, B, x) is defined as Clip(A, B, x)=A if x<A, Clip(A, B, x)=B if x>B and Clip(A, B, x)=x if A≤x≤B and $\text{Clip}_{0-255}(x)$ is defined as Clip(0, 255, x).

Strong filtering mode is performed by the following set of operations:

$$p0_i=\text{Clip}_{0-255}((p2_i+2\times p1_i+2\times p0_i+2\times q0_i+q1_i+4)>>3)$$

$$q0_i=\text{Clip}_{0-255}((p1_i+2\times p0_i+2\times q0_i+2\times q1_i+q2_i+4)>>3)$$

$$p1_i = \text{Clip}_{0\text{-}255}((p2_i + p1_i + p0_i + q0_i + 2) \gg 2)$$

$$q1_i = \text{Clip}_{0\text{-}255}((p0_i + q0_i + q1_i + q2_i + 2) \gg 2)$$

$$p2_i = \text{Clip}_{0\text{-}255}((2 \times p3_i + 3 \times p2_i + p1_i + p0_i + q0_i + 4) \gg 3)$$

$$q2_i = \text{Clip}_{0\text{-}255}((p0_i + q0_i + q1_i + 3 \times q2_i + 2 \times q3_i + 4) \gg 3)$$

As video resolutions have increased, it has been noticed that large blocks can provide good video coding benefits. Traditional block sizes are in the order of 16×16 pixels or smaller (e.g. macroblocks in H.264), but it has been shown that block sizes of up to 128×128 pixels can provide improved coding efficiency.

To enable large blocks while keeping the coding performance of small detailed areas in the same image, hierarchical coding is used. This is the case for HEVC.

Large blocks, referred to as Largest Coding Units (LCU) in HEVC, are scanned left to right in the same way as normal macroblocks in H.264. Each LCU may be split into four smaller coding units (CU), and the may be split again hierarchically in a quad-tree fashion. There is also a smallest size for the Coding Unit defined, these blocks are called Smallest Coding Unit (SCU).

FIG. 1 shows how a picture is divided in to a number of LCU blocks and how an LCU can be split in a quad-tree fashion into smaller CUs according to prior art.

FIG. 2 shows how an LCU may be split into smaller CUs. It also shows the order in which the CUs are decoded. The current HEVC operates with an LCU of 64×64 and a SCU of 4×4, but this can be configured.

Each CU has a coding type assigned, e.g. Intra, P, skip. Each CU may also be quad-tree split further in three independent quad-tree structures.

The CU has its prediction type (e.g. intra prediction or inter-prediction). The CU is also a root of two structures called prediction units and transform units. Each prediction unit inside the CU can have its own prediction that is different from the predictions of the other PU (for example, a separate motion vector or intra prediction direction). A CU can contain one PU (which has then the same size as the CU) or can be split further into up to four PUs. Those PUs can have either square or rectangular form (in this case, the vertical and horizontal PU dimensions differ). As an example, there might be a CU of size 16×16 that is split once, creating 4 8×8 prediction unit blocks (PUs). If the coding type of the CU is Intra, the PUs may have different Intra prediction modes. If the coding type of the CU is Inter, the PUs may have different motion vectors.

Then there is a transform quad-tree that also has the CU as its root. The resulting blocks are called Transform Units (TU). As an example, there might be a CU of size 16×16 that is split into 8×8 TUs. Then, one of the 8×8 TU can be split into 4×4 TUs. Then each TU is transformed with an 8×8 or a 4×4 transform. If the root TU was not split, then a 16×16 transform would have been used. Transforms can also have a non-square (rectangular) shape.

SUMMARY

Current deblocking filters are using the same filters with the same filtering strength irrespective of the block size and the size of the transform used. However, in the new video coding standards such as emerging HEVC the PU sizes can vary from 4 to 64 and the TU sizes can vary from 4 to 32.

Therefore, filtering the same amount of pixels (e.g. two or three) from the block boundary for the block of size 4 can be excessive, while for the block size 32 it may not be enough, with the result that the boundary between two blocks is still visible.

Hence, there is a need for an efficient deblocking filter control that can be used to reduce blocking artifacts at block boundaries and that does not have the above mentioned drawbacks.

It is a general objective to provide an efficient deblocking filter control.

Thus, the object is solved by applying different filters for different block sizes such as CU, PU or/and TU sizes. Accordingly, the deblocking filtering strength is adjusted based on the block size, which implies that the amount of modification applied to pixels by the deblocking filter is varied depending on the block size. The amount of modification that is being varied is in one embodiment the number of pixels to be modified.

According to a first aspect of embodiments of the present invention, a method for filter control applicable to a block of multiple pixels of a video frame is provided. The video frame comprises a plurality of blocks and each pixel has a respective pixel value. In the method, a block size is determined, and a deblocking filtering strength is adjusted based on the determined block size.

According to a second aspect of embodiments of the present invention, a filtering control device for applying a filter control to a block of multiple pixels of a video frame is provided. The video frame comprises a plurality of blocks and each pixel has a respective pixel value. The filtering control device comprises a unit configured to determine block size and a unit configured to adjust a deblocking filtering strength based on the determined block size.

According to a third aspect of embodiments of the present invention, an encoder comprising a filtering control device for applying a filter control to a block of multiple pixels of a video frame is provided. The video frame comprises a plurality of blocks and each pixel has a respective pixel value. The filtering control device comprises a unit configured to determine block size and a unit configured to adjust a deblocking filtering strength based on the determined block size.

According to a fourth aspect of embodiments of the present invention a user equipment is provided. The user equipment comprises a memory configured to store video frames; and an encoder according to the third aspect of embodiments of the present invention configured to encode said video frames into encoded video frames, wherein said memory is further configured to store said encoded video frames.

According to a fifth aspect of embodiments of the present invention, a decoder comprising a filtering control device for applying a filter control to a block of multiple pixels of a video frame is provided. The video frame comprises a plurality of blocks and each pixel has a respective pixel value. The filtering control device comprises a unit configured to determine block size and a unit configured to adjust a deblocking filtering strength based on the determined block size.

According to a sixth aspect of embodiments of the present invention, a user equipment is provided. The user equipment comprises a memory configured to store video frames; and a decoder according to the fifth aspect of embodiments of the present invention configured to encode said video frames into encoded video frames, wherein said memory is further configured to store said encoded video frames.

According to a seventh aspect of embodiments of the present invention, a post-filter comprising a filtering control device for applying a filter control to a block of multiple pixels of a video frame is provided. The video frame comprises a plurality of blocks and each pixel has a respective pixel value. The filtering control device comprises a unit configured to determine block size and a unit configured to adjust a deblocking filtering strength based on the determined block size.

According to an eighth aspect of embodiments of the present invention, a user equipment is provided. The user equipment comprises a memory configured to store video frames; and a decoder according to the fifth aspect of embodiments of the present invention configured to encode said video frames into encoded video frames, wherein said memory is further configured to store said encoded video frames that can be modified by deblocking filtering.

According to a ninth aspect of embodiments of the present invention, a method for filter control applicable to a block of multiple pixels of a video frame is provided. The video frame comprises a plurality of blocks and each pixel has a respective pixel value. In the method, a block size is determined, and a deblocking filtering strength is adjusted based on the determined block size, wherein the adjustment of the deblocking filtering strength comprises modifying a number of pixels at a block border that can be modified by deblocking filtering.

According to a tenth aspect of embodiments of the present invention, a filtering control device for applying a filter control to a block of multiple pixels of a video frame. The video frame comprises a plurality of blocks and each pixel has a respective pixel value. The filtering control comprises a unit configured to determine block size and a unit configured to adjust a deblocking filtering strength based on the determined block size, wherein the unit (120) configured to adjust a deblocking filtering strength is further configured to adjust the deblocking filtering strength by modifying a number of pixels at a block border.

An advantage with embodiments of the present invention is that the deblocking can improve the subjective quality of the reconstructed picture by applying different amount of filtering to blocks of different size. Another advantage is that some embodiments can also decrease the computation complexity as they decrease the number of filtered pixels for smaller blocks.

BRIEF DESCRIPTION OF THE DRAWINGS

FIG. 3A shows a vertical block boundary according to prior art.

FIG. 3B shows a horizontal block boundary according to prior art.

DETAILED DESCRIPTION

Figure 1:
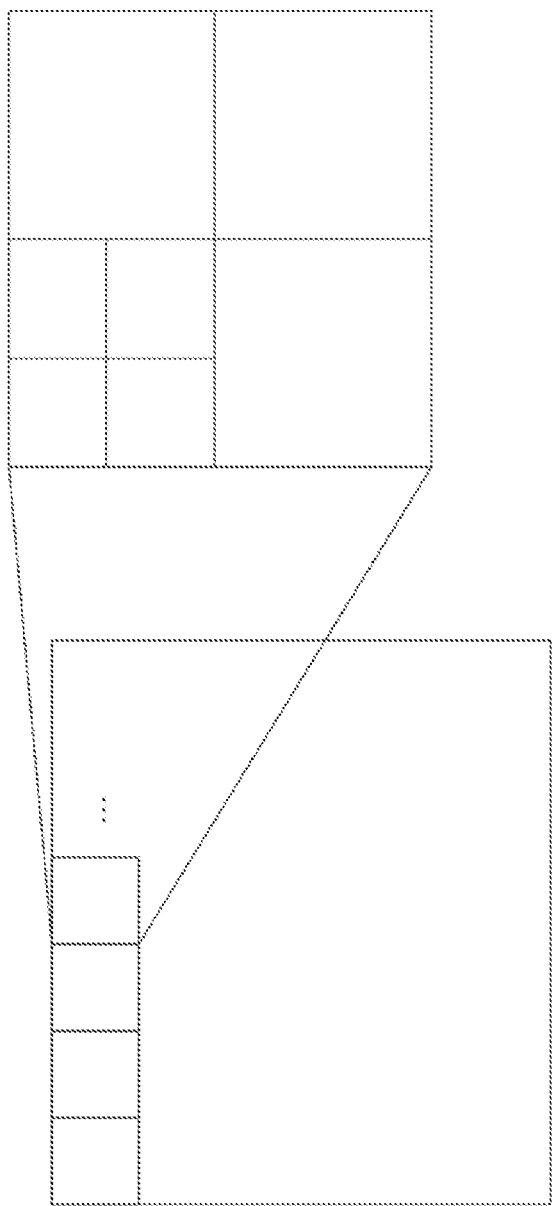
FIG. 1 shows how a picture is divided in to a number of LCU blocks and how an LCU can be split in a quad-tree fashion into smaller blocks according to prior art.
Figure 2:
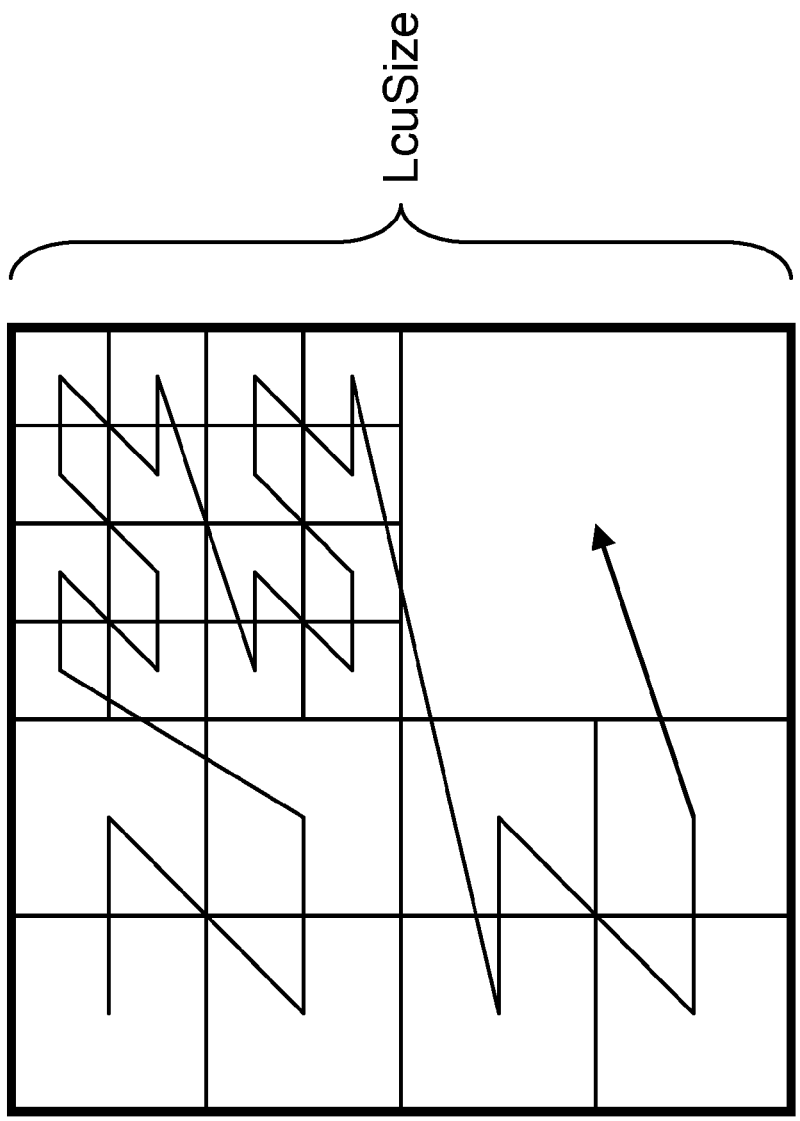
FIG. 2 shows how an LCU may be split into smaller CUs according to prior art.

Throughout the drawings, the same reference numbers are used for similar or corresponding elements.

The embodiments of the present invention relate to a filter control mechanism to improve deblocking over block boundaries in a video frame.

In the following, a block can denote either a PU or a TU. Since blocking artifacts can appear at both PU and TU boundaries due to different prediction and quantization effects, respectively, the deblocking filter can be turned on at both the PU and TU boundary. The block boundary can be, therefore a PU boundary, a TU boundary or both at the same time. Since different CU have different PUs and TUs, the CU boundary is always a PU and TU boundary and is always covered by the above definition.

Blocks of different size can have blocking artifacts of different strength. However, current HEVC deblocking treats blocks of all sizes differently. Therefore, the deblocking is improved by applying deblocking of different strength to blocks of different size in accordance with the present invention.

In H.264, a video frame is divided into non-overlapping blocks of pixels that are encoded and decoded according to the various available intra and inter coding modes. Generally, a video frame is divided into non-overlapping macroblocks of 16×16 pixels. Such a macroblock can in turn be divided into smaller blocks of different sizes, such as 4×4 or 8×8 pixels. However, also rectangular blocks (partitions) could be possible according to the embodiments, such as, 4×8, 8×4, 8×16 or 16×8. The embodiments can be applied to any such block of pixels, including macroblocks or even larger blocks of pixels.

In the emerging High Efficiency Video Coding (HEVC) standard, coding units (CU), prediction units (PU) and transform units (TU) are used. The largest coding units (LCU) are coded in the raster scan order. Each CU can be split further into smaller CUs in the quad-tree fashion until the smallest CU size is reached. The prediction units are defined inside a coding unit. Each PU has its own prediction (motion vectors or an inter-prediction mode) depending on the CU prediction type. The transform coding tree is also defined inside a coding unit. The largest transform size is 32×32 pixels and the smallest size is 4×4 pixels. The CU size is currently varying from 64×64 pixels (largest) to 8×8 pixels (smallest). In this way, the largest CU can be split into smaller CUs with the "level of granularity" depending on the local characteristics of the frame. That means that the largest CU may be split into smaller CUs of different sizes. The embodiments can also be used in connection with prediction units and transform units, which are regarded as being encompassed by the expression "block of pixels" as used herein. In the following, the word "partition" means prediction unit (PU) and those words can be used interchangeably. The reason is that in HEVC, partitioning of CU into prediction partitions (in H.264 terminology) results in Prediction Units corresponding to each prediction partition and having the corresponding spatial shape.

Each pixel in the block has a respective pixel value. Video frames generally have color values assigned to the pixels, where the color values are represented in a defined color formats. One of the common color formats uses one luminance component and two chrominance components for each pixel, although other formats exist, such as using red, green and blue components for each pixel.

Traditionally, luminance component filtering and chrominance component filtering are done separately, possibly employing different filtering decisions and different deblocking filters. It is, though, possible that the luminance filtering decisions are used in chroma filtering, like in HEVC. The embodiments can be applied to filtering control for the luminance component, the chrominance component or both the luminance component and the chrominance component. In a particular embodiment, the embodiments are applied to control luminance or luma filtering. Filtering decisions, or parts of filtering decisions for one component, such as luma, can be then used when making the filtering decisions for other components, such as chroma.

Figure 3A:
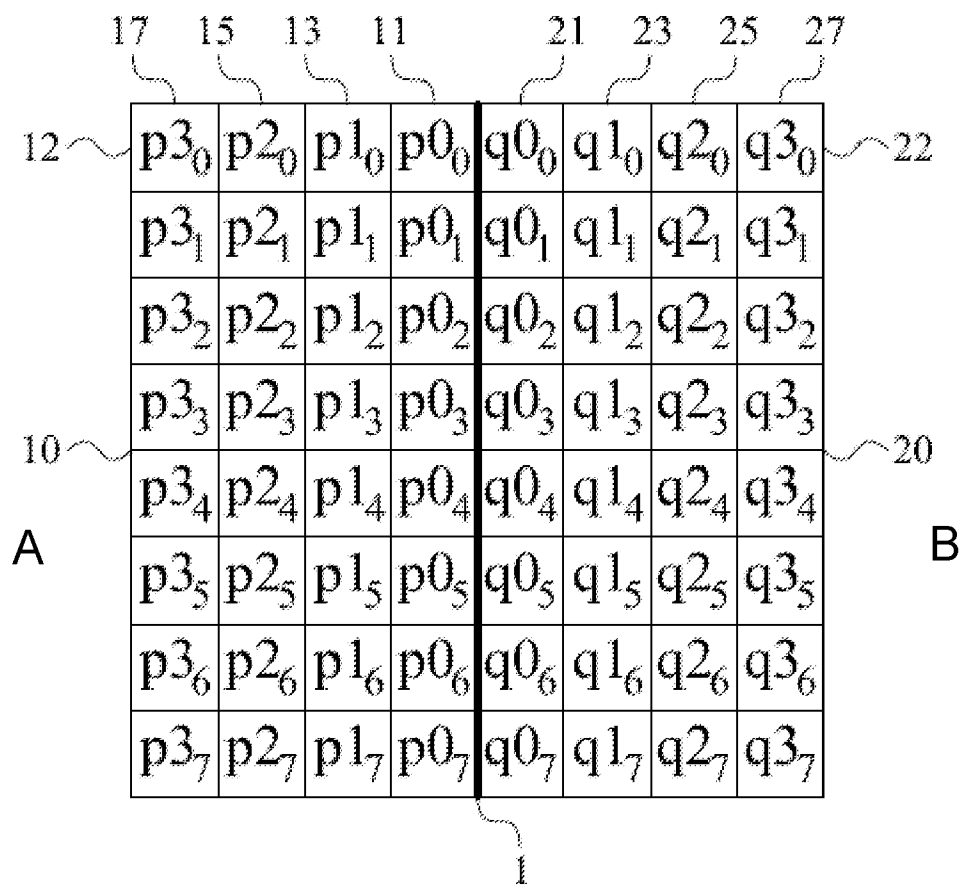
Figure 3B:
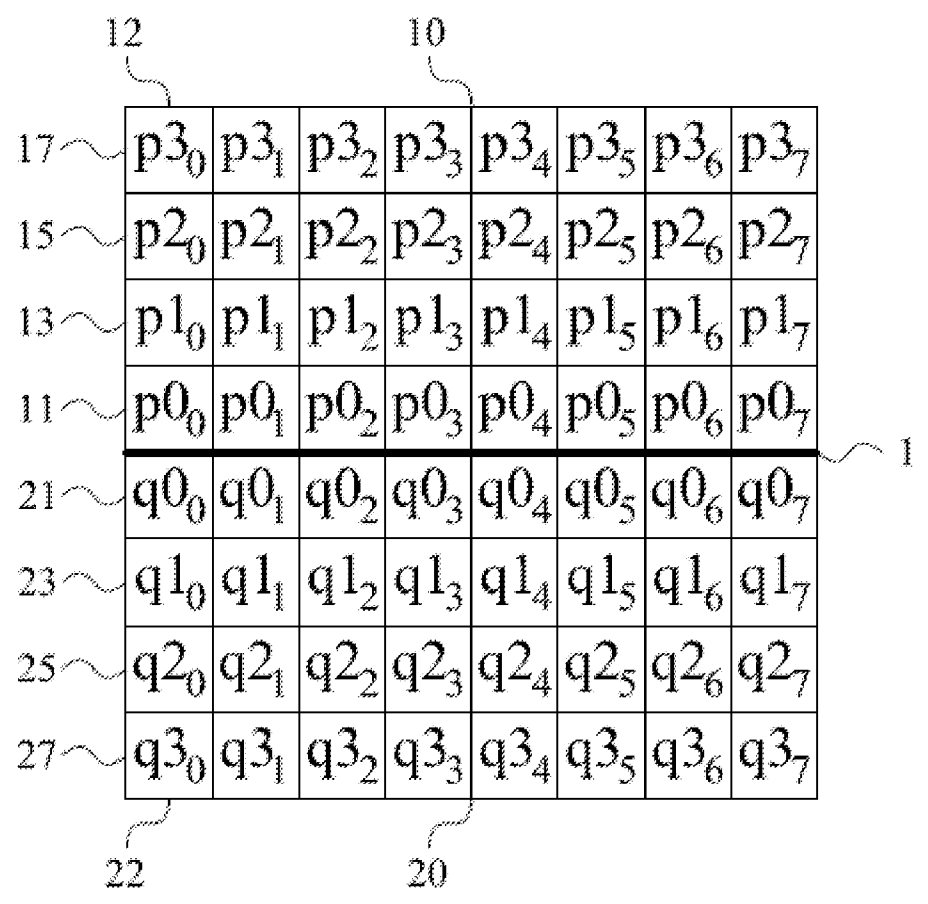

Deblocking filtering is conducted over a boundary, edge or border between neighboring blocks. As a consequence, such boundaries can be vertical boundaries 1, which can be seen in FIG. 3A, between two neighboring blocks 10, 20 present side by side in the video frame. Alternatively, the boundaries are horizontal boundaries 1, which can be seen in FIG. 3B, between two neighboring block 10, 20, where one block 10 is positioned above the other block 20 in the video frame.

Figure 4:
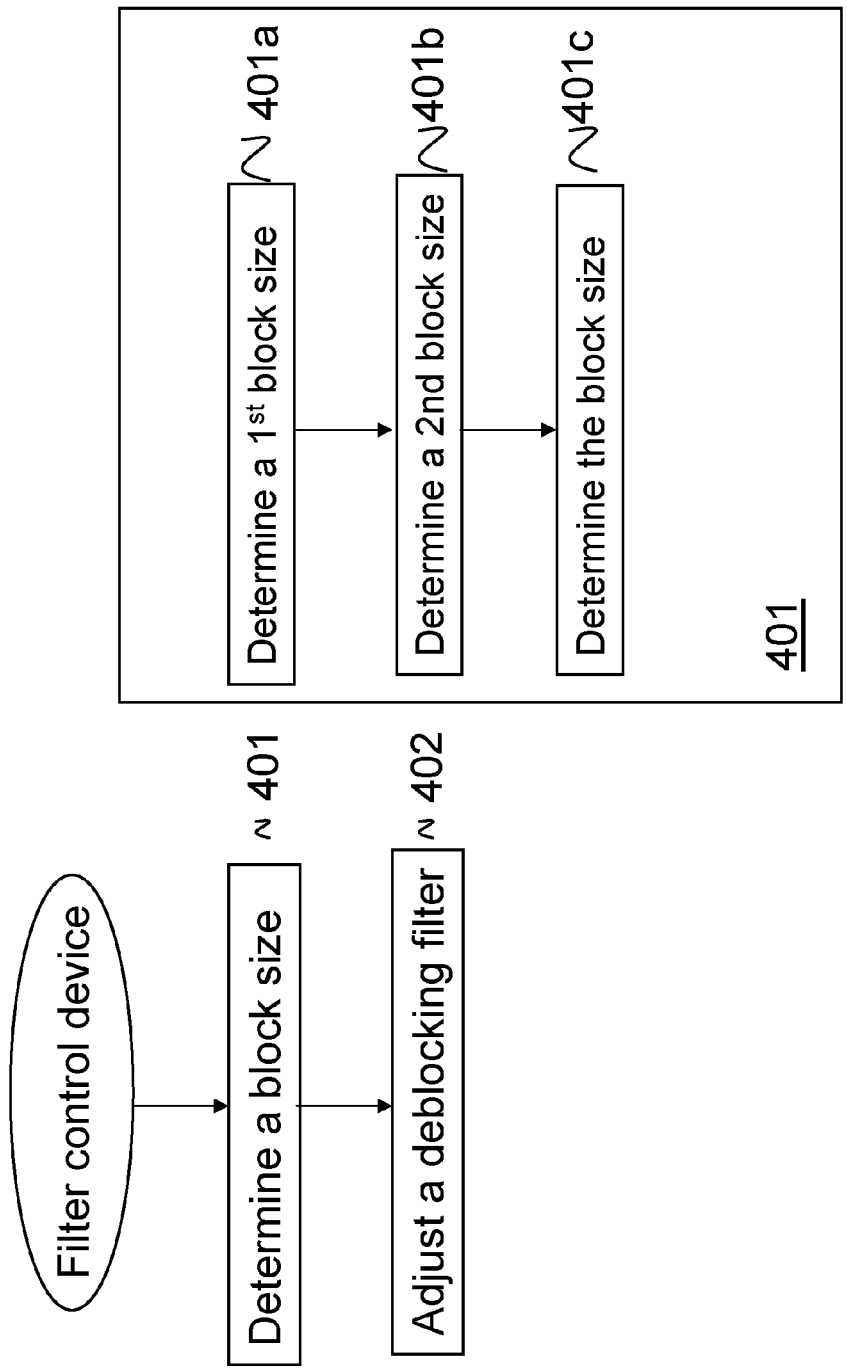
FIG. 4 is a flowchart illustrating a method according to an embodiment of the present invention.

Accordingly, the embodiments of the present invention relate to a filter control mechanism to improve deblocking over block boundaries in a video frame. This filter control mechanism adjusts the deblocking according to a block size, wherein the block size can be any PU or/and TU sizes. Accordingly, a filter control is applicable to a block of multiple pixels of a video frame, wherein the video frame comprises a plurality of blocks and each pixel has a respective pixel value. In a method according to one embodiment shown in a flowchart of FIG. 4, a block size is determined 401, and a deblocking filtering strength is adjusted 402 based on the determined block size. According to one embodiment, the adjustment of the deblocking filtering strength comprises modifying a number of pixels at a block boundary that can be modified by deblocking filtering. According to another embodiment The method according to any of claims 1-8, wherein the deblocking filtering strength is further adjusted by changing a clipping value tc based on the determined block size or by changing a threshold value, a beta parameter.

The number of pixels to be modified may be equal on both sides of the block boundary, or the number of pixels to be modified can also differ between the blocks lying on different sides of the block boundary, also referred to as block border.

The block size can be determined 401 by determining 401a a first block size wherein the first block size is a size associated with the block, and determining 401b a second block size wherein the second block size is a size associated with the neighboring block, wherein the determined block 401c size is a minimum of the first block size and the second block size. Thus the block sizes on both sides of the block boundary are calculated. The variable BlockSize is set to the value min(GetBlockSize(A), GetBlockSize(B)) e.g. with reference to FIG. 3A.

Furthermore according to embodiments, the size of the first block and the second block, respectively, is determined as a minimum of partition size (Prediction Unit (PU) size) and the transform size to which the pixels on the side of the block boundary belong and the partition size (PU size) is the smallest of the vertical partition size (PU size) and the horizontal partition size (PU size). Thus, the function GetBlockSize(Block) is defined as a minimum of GetPartitionSize(Block) and GetTransformSize(Block), i.e. min(GetPartitionSize(Block), GetTransformSize(Block)), to which the pixels on the side of the block boundary belong. GetPartitionSize(Block) returns the smaller of the two partition dimensions (vertical and horizontal). In an alternative implementation, for filtering of a horizontal line of pixels across the vertical boundary between two blocks the horizontal size of the partition (and/or respectively transform) is returned. Likewise, in the same embodiment, for filtering of a vertical line (column) of pixels across the horizontal boundary between two blocks, the vertical size of the partition (and/or respectively transform) is returned.

In one particular embodiment, if the block size is 4, one pixel in the block at the block boundary is modified, if the block size is 8 at most two pixels in the block at the block boundary are modified, and if the block size is equal to or larger than 16 up to three pixels in the block at the block boundary are modified.

Figure 5:
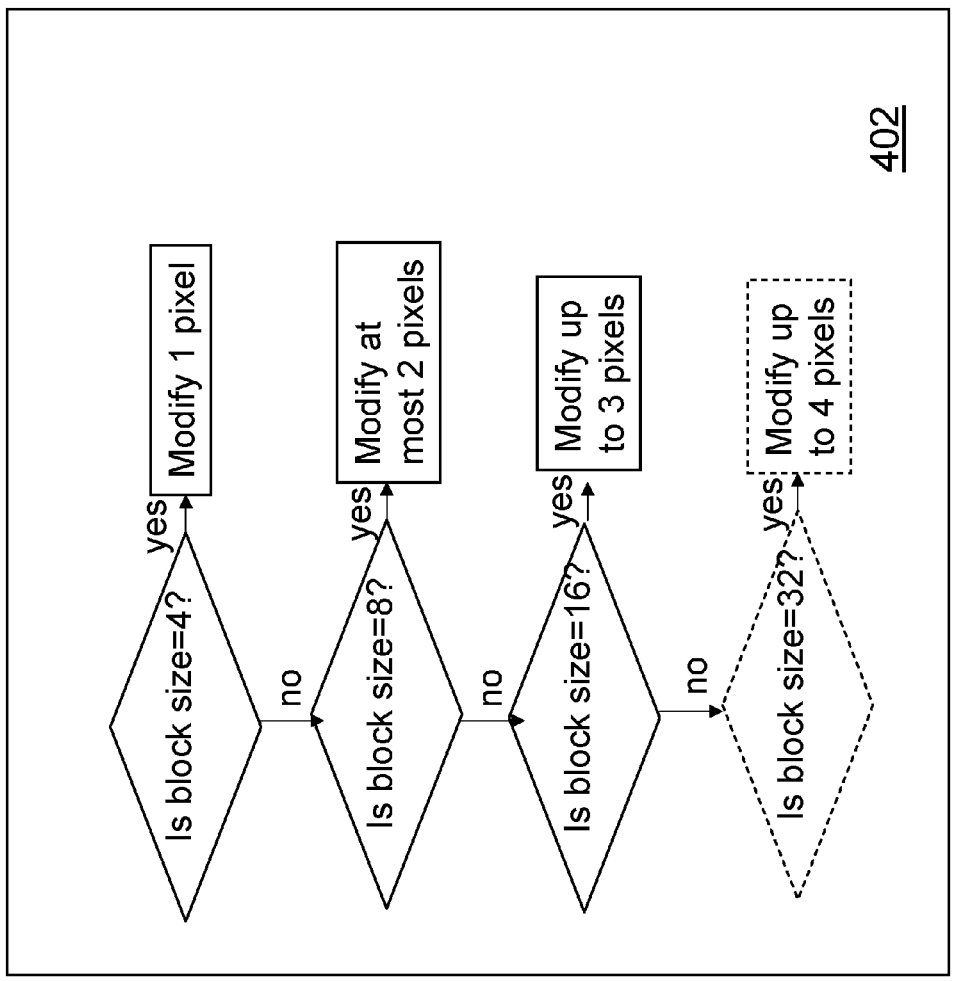
FIGS. 5 and 6 are flowcharts showing an embodiment of the present invention.

This is also illustrated by the following sequence and in the flowchart of FIG. 5:

```
if ( BlockSize ==4 )
{
    One pixel from at block border is modified
}
else if ( BlockSize ==8 )
{
    At most two pixels from the block border are modified
}
else // if (BlockSize >= 16)
{
    Up to three pixels from the block border are modified
}
```

In another particular embodiment, if the block size is 4, one pixel in the block at the block border is modified, if the block size is 8 at most two pixels in the block at the block border are modified, if the block size is equal to than 16 up to three pixels in the block at the block border are modified, and if the block size is equal to 32 up to four pixels in the block at the block border are modified. This is also illustrated by the following sequence:

```
if ( BlockSize ==4 )
{
    One pixel from the block border is modified
}
else if ( BlockSize ==8 )
{
    At most two pixels from the block border are modified
}
else if (BlockSize == 16)
{
    Up to three pixels from the block border are modified
}
else // if (BlockSize == 32)
{
    Up to four pixels from the block border are modified
}
```

Moreover, the filtering strength e.g. defined by a clipping value, tc, or a threshold value beta, the type of filtering and the decision for filtering can also be varied dependent on the block size such as CU, TU and PU.

Thus, the amount of filtering for the block size can also be changed by changing the clipping value tc for a delta (offset) or/and the threshold value beta β depending on the BlockSize. In one of the embodiments, tc values can be chosen from a table tc(QP, BlockSize). The values can also be chosen as tc(QP+offset(BlockSize)) from a one-dimensional tc table. Here the offset depends on the block size and is chosen from the table. One example of adjusting the deblocking filtering strength by changing a clipping value tc based on the determined block size is illustrated below.

```
if (BlockSize ==4 )
{
    tc = tc(QP, 4);
}
else if (BlockSize ==8)
{
    tc = tc(QP, 8);
}
else if (BlockSize == 16)
{
    tc = tc(QP, 16);
}
else {
    tc = tc(QP, 32);
}
}
```

The values of beta β can be chosen from the table β (QP, BlockSize). The values can also be chosen as β(QP+offset (BlockSize)) from a one-dimensional β table. Here the offset depends on the block size and is chosen from the table.

The tc parameter is a clipping value that defines how much the pixel can be changed. The beta parameter, however, mostly determines if the block boundary is filtered and (in the current HEVC deblocking) how many pixels from the block boundary are filtered. The table for derivation of tc and beta parameters depending on the QP (quantization parameter) is shown below. One can see that the parameter tc or beta can be derived from the table. However, the default value of tc and beta for the current QP can be changed by adding an offset to QP and deriving parameter beta and tc from the table.

Clipping can be described as delta_clipped=max(−thr, min(thr, delta)), where thr is controlling the filter strength. Therefore, the clipping parameter tc is applied to the delta value Δ as in the following. Δclipped=max(−tc, min(tc, delta)). The clipped value of delta is the modification of the pixel value. Therefore, smaller values of tc result in less filtering whereas a larger value of tc allows stronger filtering.

In a further embodiment, a first pixel is modified as a neighboring pixel away from the border with addition of a delta value Δ.

This can be implemented as below (the implementation is shown without considering the clipping of delta values):

```
if (BlockSize ==4 )
{
    Δ = (9*(q0−p0) −3*(q1−p1))/16
    p0' = p1 + Δ
    q0' = q1 + Δ
}
else if (BlockSize ==8)
{
    Δ = (9*(q0−p0) −3*(q1−p1))/16
    p0' = p1 + Δ
    q0' = q1 + Δ
    Δp1 = (p0+p2−2*p1+2*Δ)/4;
    p1' = p1 + Δp1
    Δq1 = (q0+q2−2*q1−2*Δ)/4;
    q1' = q1 + Δq1
}
else // if (BlockSize >= 16)
{
    if (Criterion 1 )
    {
        HEVC Strong filter (3pixels from the border)
    }
    else
    {
        Δ = (9*(q0−p0) −3*(q1−p1))/16
        p0' = p1 + Δ
        q0' = q1 + Δ
        Δp1 = (p0+p2−2*p1+2*Δ)/4;
        p1' = p1 + Δp1
        Δq1 = (q0−q2−2*q1−2*Δ)/4;
        q1' = q1 + Δq1
    }
}
```

The implementation with clipping using a programming language may look like below.

```
if (BlockSize ==4 )
{
    delta = (9*(m4−m3) −3*(m5−m2) + 8)>>4 ;
    delta = Clip3(−tc, tc, delta);
    piSrc[−iOffset] = Clip((m3+delta));
    piSrc[0] = Clip((m4−delta));
}
else if (BlockSize ==8)
{
    delta = (9*(m4−m3) −3*(m5−m2) + 8)>>4 ;
    delta = Clip3(−tc, tc, delta);
    piSrc[−iOffset] = Clip((m3+delta));
```

TABLE

Derivation of threshold variables β and $t_C$ from input QP

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β | 0 | 0 | 0 | 0 | 0 | 0 | 0 | 0 | 0 | 0 | 0 | 0 | 0 | 0 | 0 | 0 | 6 | 7 | 8 |
| $t_C$ | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| β | 9 | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 1 | 2 | 2 | 2 | 2 | 3 | 3 | 3 | 3 | 4 | 4 | 4 |

| Q | 38 | 39 | 40 | 41 | 42 | 43 | 44 | 45 | 46 | 47 | 48 | 49 | 50 | 51 | 52 | 53 | 54 | 55 |
|---|----|----|----|----|----|----|----|----|----|----|----|----|----|----|----|----|----|----|
| β | 38 | 40 | 42 | 44 | 46 | 48 | 50 | 52 | 54 | 56 | 58 | 60 | 62 | 64 | 64 | 64 | 64 | 64 |
| $t_C$ | 5 | 5 | 6 | 6 | 7 | 8 | 9 | 9 | 10 | 10 | 11 | 11 | 12 | 12 | 13 | 13 | 14 | 14 |

```
        piSrc[0] = Clip((m4-delta));
        Int delta1 = Clip3(-tc2, tc2, (( ((m1+m3+1)>>1)- m2+delta)>>1));
        piSrc[-iOffset*2] = Clip((m2+delta1));
        Int delta2 = Clip3(-tc2, tc2, (( ((m6+m4+1)>>1)- m5-delta)>>1));
        piSrc[ iOffset] = Clip((m5+delta2));
}
else // if (BlockSize >= 16)
{
        if (Criterion 1 )
        {
                HEVC Strong filter (3pixels from the border)
        }
        else
        {
           delta = (9*(m4-m3) -3*(m5-m2) + 8)>>4 ;
           delta = Clip3(-tc, tc, delta);
           piSrc[-iOffset] = Clip((m3+delta));
           piSrc[0] = Clip((m4-delta));
           Int delta1 = Clip3(-tc2, tc2, (( ((m1+m3+1 )>>1)-
           m2+delta)>>1));
           piSrc[-iOffset*2] = Clip((m2+delta1));
           Int delta2 = Clip3(-tc2, tc2, (( ((m6+m4+1)>>1)-
           m5-delta)>>1));
           piSrc[ iOffset] = Clip((m5+delta2));
        }
}
```

Here the Criterion1 is the criterion used in HEVC for strong filtering as described above.

Figure 6:
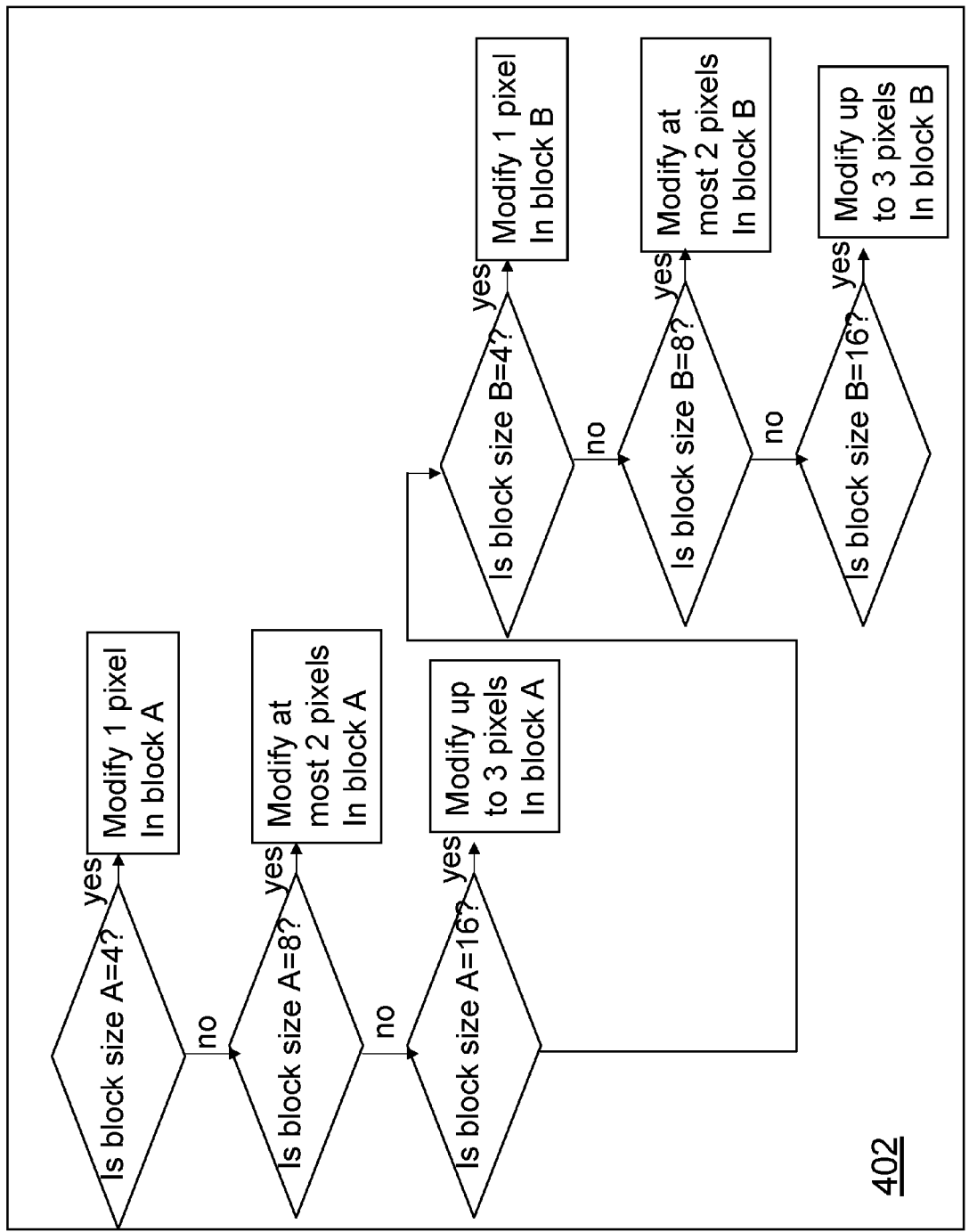

In a yet further embodiment, the number of pixels to be modified is being calculated for each block separately. An exemplary implementation is disclosed below and in the flowchart of FIG. 6:

```
if ( BlockSizeA ==4 )
{
    One pixel from the block border is modified for block A.
}
else if ( BlockSizeA ==8 )
{
At most two pixels from the block border are modified for block A.
}
else // if (BlockSizeA >= 16)
{
    Up to three pixels from the block border are modified for block A.
}
if ( BlockSizeB ==4 )
{
    One pixel from the block border is modified for block B.
}
else if ( BlockSizeB ==8 )
{
At most two pixels from the block border are modified for block B.
}
else // if (BlockSizeB >= 16)
{
    Up to three pixels from the block border are modified for block B.
}
```

In particular cases, embodiments allow to avoid overlapping of the deblocking filtering from two sides of the block border. For example, in the HEVC scenario, if the deblocking modifies only one pixel from the block border in a 4×4 block, then the deblocking operation in the block on the left block boundary would not influence the results of the deblocking operation on the block boundary at the right side of the block, even in case of filtering on the 4×4-block grid. Therefore, the deblocking operation can be parallelized.

Figure 7:
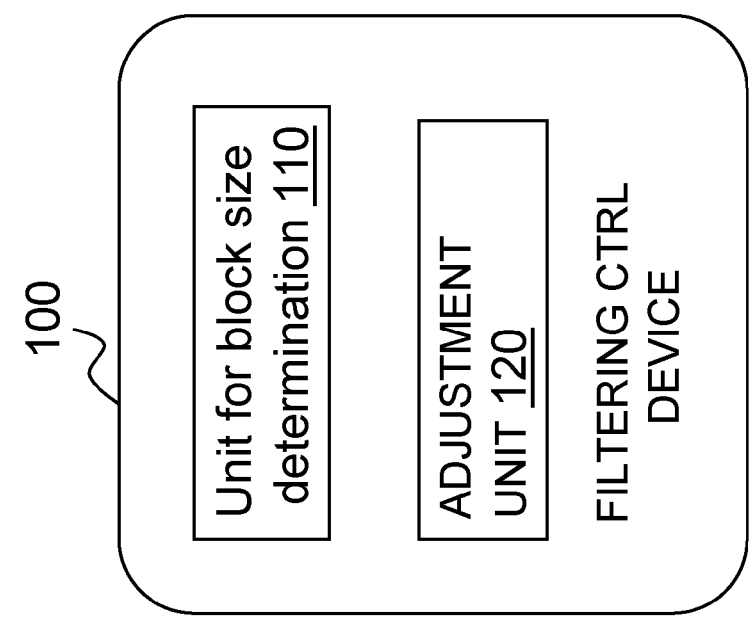
FIG. 7 is a schematic block diagram of a filtering control device according to embodiments of the present invention.

FIG. 7 is a schematic block diagram of an embodiment of a filtering control device 100. The filtering control device 100 comprises, in this embodiment the filtering control device 100 comprises a unit 110 configured to determine block size and a unit 120 configured to adjust a deblocking filtering strength based on the determined block size.

According to an embodiment, the unit 120 configured to adjust a deblocking filtering strength is further configured to adjust the deblocking filtering strength by modifying a number of pixels at a block boundary.

According to a further embodiment, the unit 120 configured to adjust a deblocking filtering strength is further configured to adjust the deblocking filtering strength by changing a clipping value tc based on the determined block size.

In another embodiment, the unit 120 configured to adjust a deblocking filtering strength is further configured to adjust the deblocking filtering strength by changing a threshold value, a beta parameter based on the determined block size.

The unit 120 configured to adjust a deblocking filtering strength may also be configured to modify a first pixel away from the boundary with addition (or subtraction) of a delta value.

Although the respective units 110-120 disclosed in conjunction with FIG. 7 have been disclosed as physically separate units 110-196 in the filtering control device 100, and all units may be special purpose circuits, such as ASICs (Application Specific Integrated Circuits), alternative embodiments of the filtering control device 100 are possible where some or all of the units 110-120 are implemented as computer program modules running on a general purpose processor. Such an embodiment is disclosed in FIG. 8.

Figure 8:
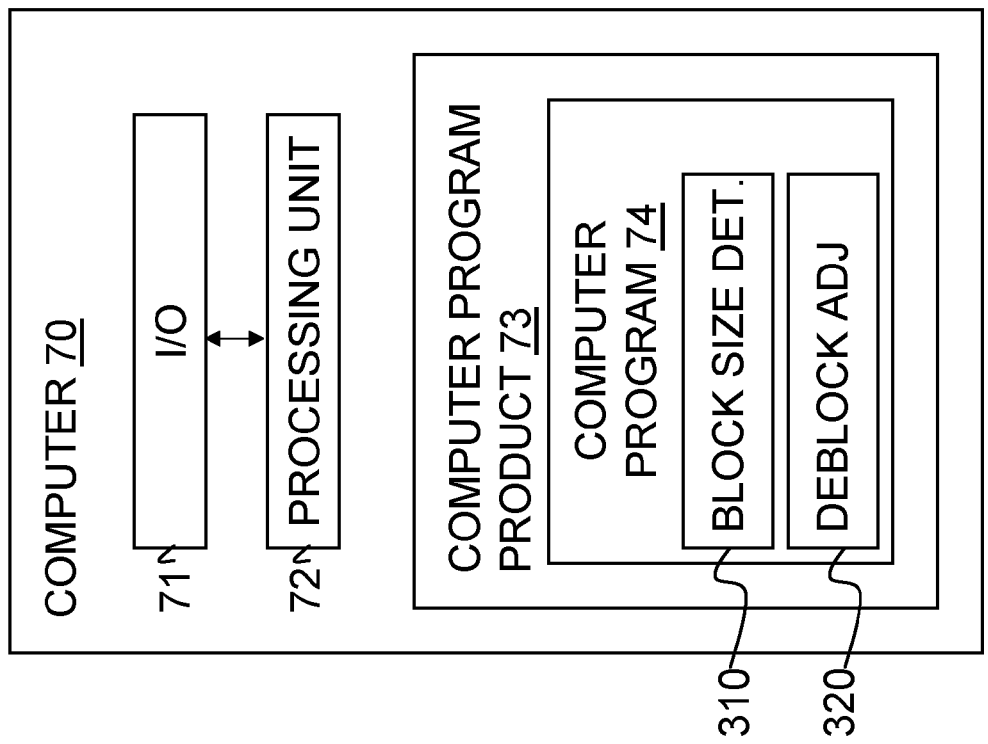
FIG. 8 is a schematic block diagram of a software implementation of a filtering control device in a computer according to an embodiment.

FIG. 8 schematically illustrates an embodiment of a computer 70 having a processing unit 72, such as a DSP (Digital Signal Processor) or CPU (Central Processing Unit). The processing unit 72 can be a single unit or a plurality of units for performing different steps of the method described herein. The computer 70 also comprises an input/output (I/O) unit 71 for receiving recorded or generated video frames or encoded video frames and outputting encoded video frame or decoded video data. The I/O unit 71 has been illustrated as a single unit in FIG. 8 but can likewise be in the form of a separate input unit and a separate output unit.

Furthermore, the computer 70 comprises at least one computer program product 73 in the form of a non-volatile memory, for instance an EEPROM (Electrically Erasable Programmable Read-Only Memory), a flash memory or a disk drive. The computer program product 73 comprises a computer program 74, which comprises code means which when run on or executed by the computer 70, such as by the processing unit 72, causes the computer 70 to perform the steps of the method described in the foregoing in connection with FIG. 4. Hence, in an embodiment the code means in the computer program 74 comprises a block size determination module 310 for determining block sizes according to the embodiments and a module 320 for adjusting deblocking filtering strength based on the determined block sizes according to the embodiments. These modules 310-320 essentially perform the steps of the flow diagram in FIG. 4 when run on the processing unit 72. Thus, when the different modules 310-320 are run on the processing unit 72 they correspond to the corresponding units 110-120 of FIG. 7.

The computer 70 of FIG. 8 can be a user equipment or be present in a user equipment. In such a case, the user equipment 80 may additionally comprise or be connected to a display to display video data.

The filtering control device of FIG. 7 is preferably used in video coding. It functions and is therefore preferably implemented both in a video encoder and in a video decoder. The filtering control device can also be implemented in a post-filter. The video decoder can be implemented preferably in hardware but also in software. The same holds for the video encoder.

Figure 9:
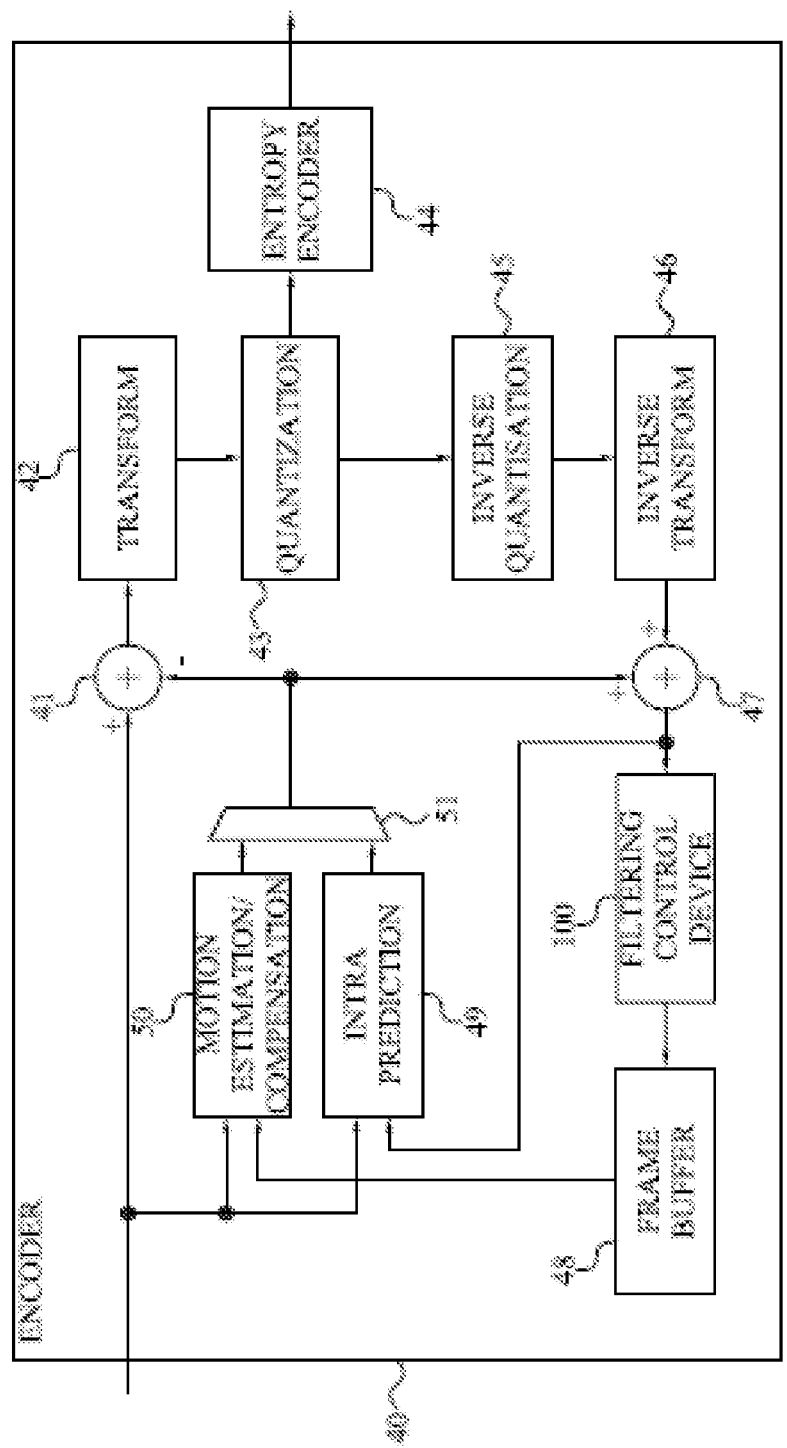
FIG. 9 shows an encoder embodying the filtering control device according to embodiments of the present invention.

FIG. 9 is a schematic block diagram of an encoder 40 for encoding a block of pixels in a video frame of a video sequence according to an embodiment.

A current block of pixels is predicted by performing a motion estimation by a motion estimator 50 from an already provided block of pixels in the same frame or in a previous frame. The result of the motion estimation is a motion or displacement vector associated with the reference block, in the case of inter prediction. The motion vector is utilized by a motion compensator 50 for outputting an inter prediction of the block of pixels.

An intra predictor 49 computes an intra prediction of the current block of pixels. The outputs from the motion estimator/compensator 50 and the intra predictor 49 are input in a selector 51 that either selects intra prediction or inter prediction for the current block of pixels. The output from the selector 51 is input to an error calculator in the form of an adder 41 that also receives the pixel values of the current block of pixels. The adder 41 calculates and outputs a residual error as the difference in pixel values between the block of pixels and its prediction.

The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of pixels.

The transformed and quantized residual error for the current block of pixels is also provided to a inverse quantizer 45 and inverse transformer 46 to retrieve the original residual error. This error is added by an adder 47 to the block prediction output from the motion compensator 50 or the intra predictor 49 to create a reference block of pixels that can be used in the prediction and coding of a next block of pixels. This new reference block is first processed by a filtering control device 100 according to the embodiments in order to control any deblocking filtering that is applied to the reference block to combat any blocking artifact. The processed new reference block is then temporarily stored in a frame buffer 48, where it is available to the intra predictor 49 and the motion estimator/compensator 50.

Figure 10:
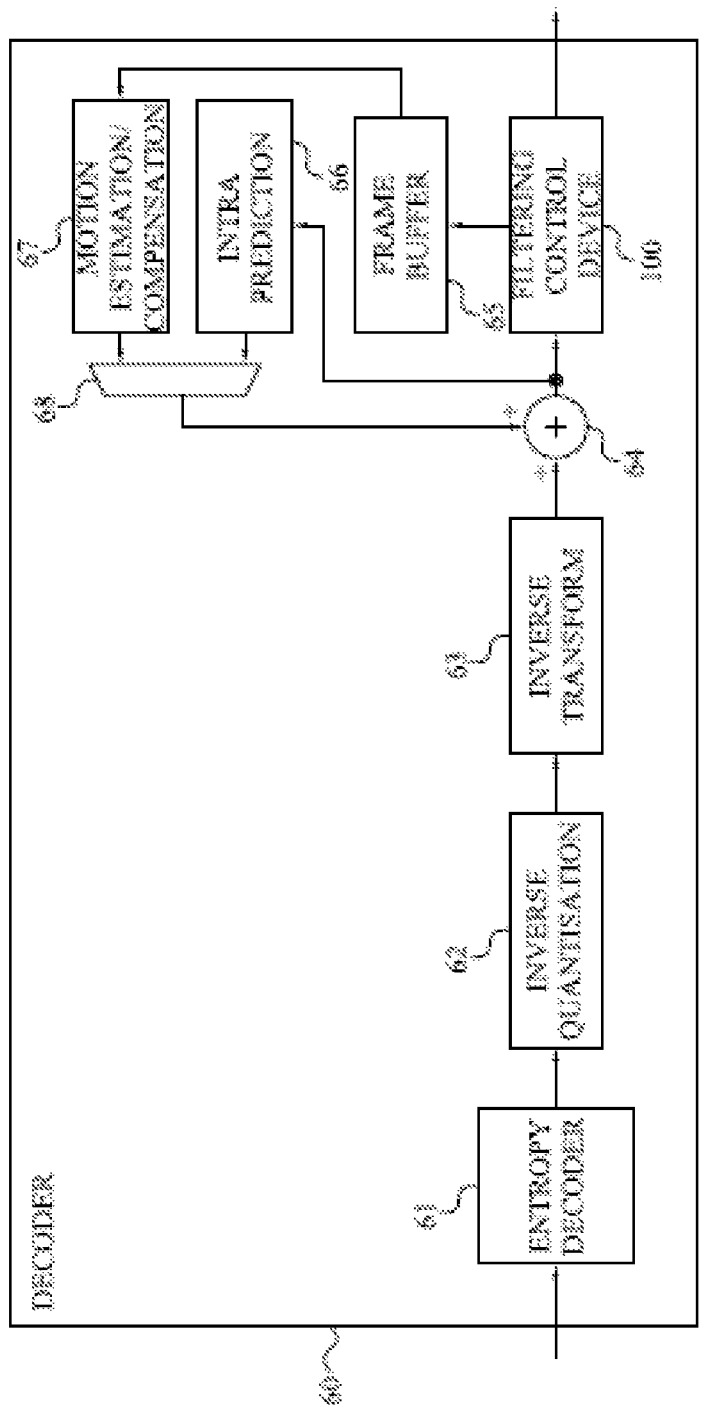
FIG. 10 shows a decoder embodying the filtering control device according to embodiments of the present invention.

FIG. 10 is a corresponding schematic block diagram of a decoder 60 comprising a filtering control device 100 according to the embodiments. The decoder 60 comprises a decoder 61, such as entropy decoder, for decoding an encoded representation of a block of pixels to get a set of quantized and transformed residual errors. These residual errors are dequantized in an inverse quantizer 62 and inverse transformed by an inverse transformer 63 to get a set of residual errors.

These residual errors are added in an adder 64 to the pixel values of a reference block of pixels. The reference block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block of pixels output from the adder 64 is input to a filtering control device 100 according to the embodiments in order to control any deblocking filter that is applied to combat any blocking artifacts. The filtered block of pixels is output form the decoder 60 and is furthermore preferably temporarily provided to a frame buffer 65 and can be used as a reference block of pixels for a subsequent block of pixels to be decoded. The frame buffer 65 is thereby connected to the motion estimator/compensator 67 to make the stored blocks of pixels available to the motion estimator/compensator 67.

The output from the adder 64 is preferably also input to the intra predictor 66 to be used as an unfiltered reference block of pixels.

In the embodiments disclosed in FIGS. 9 and 10 the filtering control device 100 controls deblocking filtering in the form of so called in-loop filtering. In an alternative implementation at the decoder 60 the filtering control device 100 is arranged to perform so called post-processing filtering. In such a case, the filtering control device 100 operates on the output frames outside of the loop formed by the adder 64, the frame buffer 65, the intra predictor 66, the motion estimator/compensator 67 and the selector 68. No deblocking filtering and filter control is then typically done at the encoder.

Figure 11:
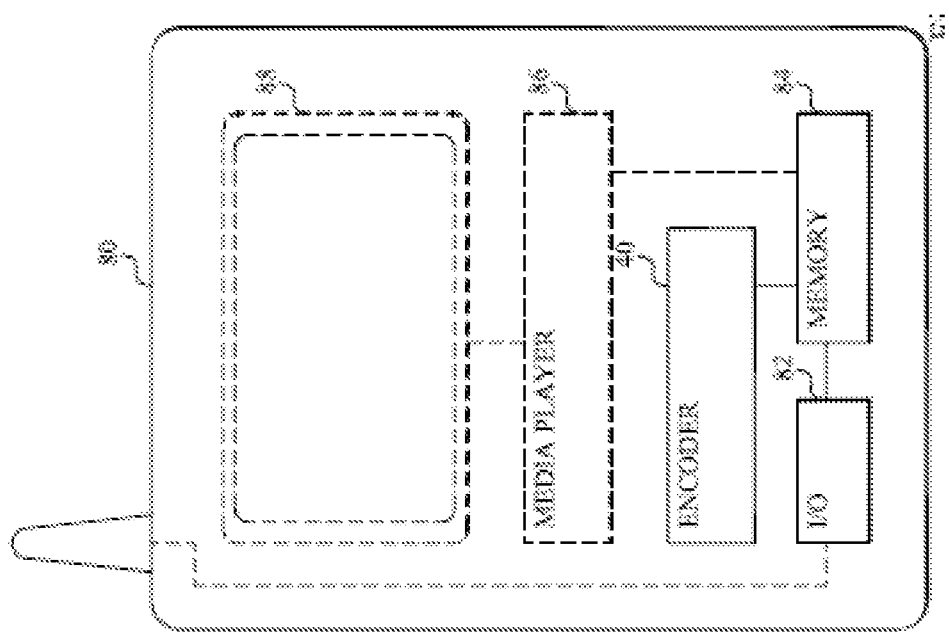
FIG. 11 a schematic block diagram of a user equipment according to an embodiment.

FIG. 11 is a schematic block diagram of a user equipment or media terminal 80 housing a decoder 60 with a filtering control device. The user equipment 80 can be any device having media decoding functions that operates on an encoded video stream of encoded video frames to thereby decode the video frames and make the video data available. Non-limiting examples of such devices include mobile telephones and other portable media players, tablets, desktops, notebooks, personal video recorders, multimedia players, video streaming servers, set-top boxes, TVs, computers, decoders, game consoles, etc. The user equipment 80 comprises a memory 84 configured to store encoded video frames. These encoded video frames can have been generated by the user equipment 80 itself. Alternatively, the encoded video frames are generated by some other device and wirelessly transmitted or transmitted by wire to the user equipment 80. The user equipment 80 then comprises a transceiver (transmitter and receiver) or input and output port 82 to achieve the data transfer.

The encoded video frames are brought from the memory 84 to a decoder 60, such as the decoder illustrated in FIG. 10. The decoder 60 comprises a filtering control device 100 according to embodiments. The decoder 60 then decodes the encoded video frames into decoded video frames. The decoded video frames are provided to a media player 86 that is configured to render the decoded video frames into video data that is displayable on a display or screen 88 of or connected to the user equipment 80.

Figure 12:
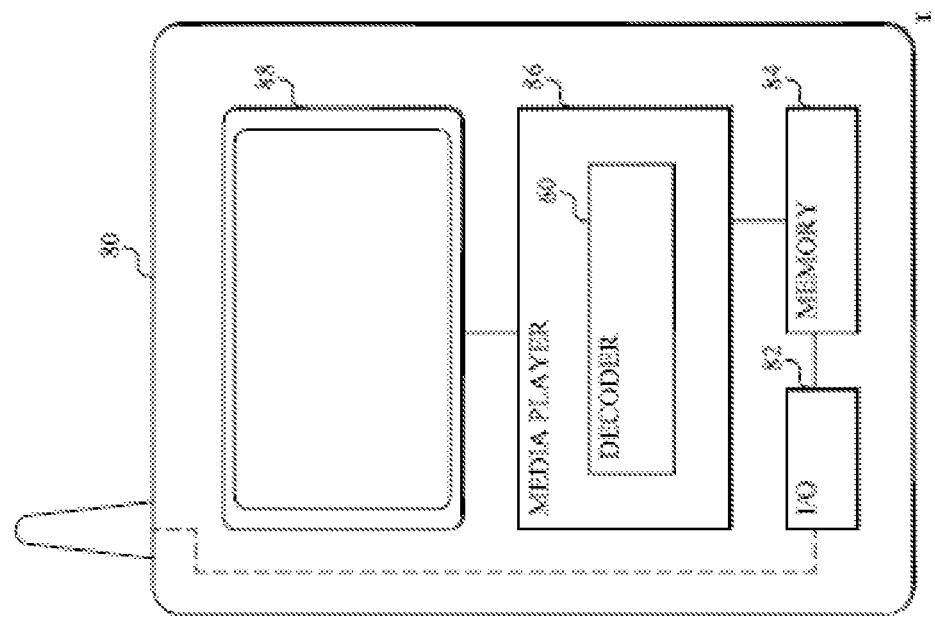
FIG. 12 a schematic block diagram of a user equipment according to an embodiment.

In FIG. 12, the user equipment 80 has been illustrated as comprising both the decoder 60 and the media player 86, with the decoder 60 implemented as a part of the media player 86. This should, however, merely be seen as an illustrative but non-limiting example of an implementation embodiment for the user equipment 80. Also distributed implementations are possible where the decoder 60 and the media player 86 are provided in two physically separated devices are possible and within the scope of user equipment 80 as used herein. The display 88 could also be provided as a separate device connected to the user equipment 80, where the actual data processing is taking place.

FIG. 11 illustrates another embodiment of a user equipment 80 that comprises en encoder, such as the encoder of FIG. 9, comprising a filtering control device according to the embodiments. The encoder 40 is then configured to encode video frames received by the I/O unit 82 and/or generated by the user equipment 80 itself. In the latter case, the user equipment 80 preferably comprises a media engine or recorder, such as in the form of or connected to a (video) camera. The user equipment 80 may optionally also comprise a media player 86, such as a media player 86 with a decoder and filtering control device according to the embodiments, and a display 88.

Figure 13:
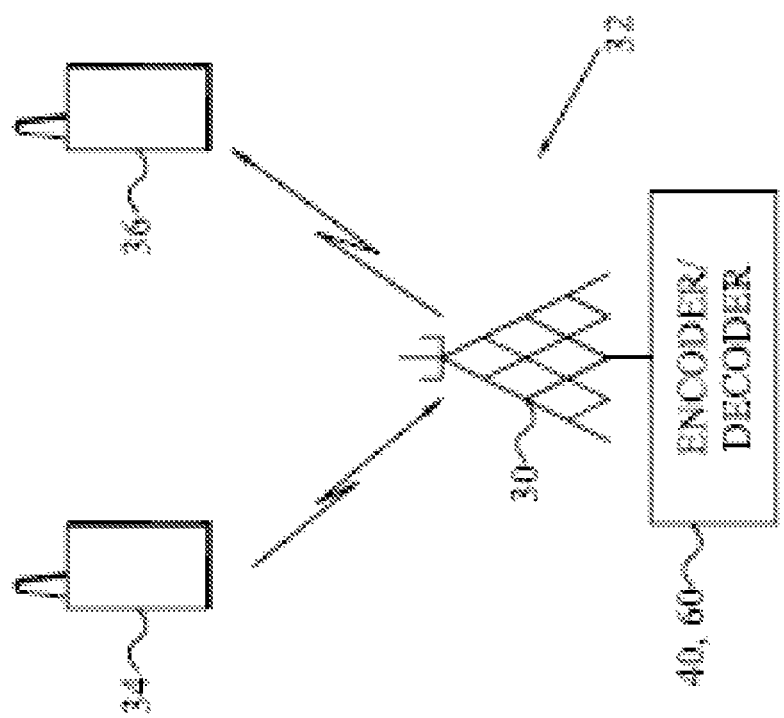
FIG. 13 is a schematic overview of a portion of a communication network comprising a network device according to an embodiment.

As illustrated in FIG. 13, the encoder 40 and/or decoder 60, such as illustrated in FIGS. 9 and 10, may be implemented in a network device 30 being or belonging to a network node in a communication network 32 between a sending unit 34 and a receiving user equipment 36. Such a network device 30 may be a device for converting video according to one video coding standard to another video coding standard, for example, if it has been established that the receiving user equipment 36 is only capable of or prefers another video coding standard than the one sent from the sending unit 34. The network device 30 can be in the form of or comprised in a radio base station, a Node-B or any other network node in a communication network 32, such as a radio-based network.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for filter control applicable to a block of multiple pixels of a video frame, wherein the video frame comprises a plurality of blocks and each pixel has a respective pixel value, the method comprising:
   determining a block size by:
      determining a first block size wherein the first block size is a size associated with the block, and
      determining a second block size wherein the second block size is a size associated with a neighboring block, and
      determining the block size as a minimum of the first block size and the second block size,
      wherein the size of the first block and the second block, respectively, is determined as a minimum of a partition size and a transform size to which the pixels on the respective side of the block boundary belong; and
   adjusting a deblocking filtering strength based on the determined block size.

2. The method according to claim 1, wherein the adjustment of the deblocking filtering strength comprises modifying a number of pixels at a block boundary that can be modified by deblocking filtering.

3. The method according to claim 1, wherein the partition size is the smallest of the vertical partition size and the horizontal partition size.

4. The method according to claim 1, wherein the partition size is a horizontal partition size in case of horizontal filtering over a vertical block boundary and the partition size is a vertical partition size in case of vertical filtering over a horizontal block boundary.

5. The method according to claim 1, wherein if the block size is 4, one pixel in the block at the block boundary is modified, if the block size is 8 at most two pixels in the block at the block boundary are modified, and if the block size is equal to or larger than 16 up to three pixels in the block at the block boundary are modified.

6. The method according to claim 1, wherein if the block size is 4, one pixel in the block at the block boundary is modified, if the block size is 8 at most two pixels in the block at the block boundary are modified, if the block size is equal to 16 up to three pixels in the block at the block boundary are modified, and if the block size is equal to 32 up to four pixels in the block at the block boundary are modified.

7. The method according to claim 1, wherein the deblocking filtering strength is further adjusted by changing a clipping value tc based on the determined block size.

8. The method according to claim 1, wherein the deblocking filtering strength is further adjusted by changing a threshold value, a beta parameter.

9. The method according to claim 1, wherein a first pixel is modified as a neighboring pixel away from the boundary with addition of a delta value.

10. The method according to claim 1, wherein the number of pixels to be modified is calculated for each block separately based on the size of the block on the respective side of the block boundary.

11. A filtering control device for applying a filter control to a block of multiple pixels of a video frame, wherein the video frame comprises a plurality of blocks and each pixel has a respective pixel value, the filtering control device comprises:
   a unit configured to determine block size by:
      determining a first block size wherein the first block size is a size associated with the block, and
      determining a second block size wherein the second block size is a size associated with a neighboring block, and
      determining the block size as a minimum of the first block size and the second block size,
      wherein the size of the first block and the second block, respectively, is determined as a minimum of a partition size and a transform size to which the pixels on the respective side of the block boundary belong; and
   a unit configured to adjust a deblocking filtering strength based on the determined block size.

12. The filtering control device according to claim 11, wherein the unit configured to adjust the deblocking filtering strength is further configured to adjust the deblocking filtering strength by modifying a number of pixels at a block boundary that can be modified by deblocking filtering.

13. The filtering control device according to claim 12, wherein the unit configured to adjust the deblocking filtering strength is configured to modify a first pixel as a neighboring pixel away from the boundary with addition of a delta value.

14. The filtering control device according to claim 12, wherein the number of pixels to be modified is being calculated for each block separately based on the size of the block on the respective side of the block boundary.

15. The filtering control device according to claim 11, wherein the partition size is the smallest of the vertical partition size and the horizontal partition size.

16. The filtering control device according to claim 11, wherein the partition size is a horizontal partition size in case of horizontal filtering over a vertical block boundary and the partition size is a vertical partition size in case of vertical filtering over a horizontal block boundary.

17. The filtering control device according to claim 11, wherein if the block size is 4, one pixel in the block at the block boundary is modified, if the block size is 8, at most two pixels in the block at the block boundary are modified, and if the block size is equal to or larger than 16, up to three pixels in the block at the block boundary are modified.

18. The filtering control device according to claim 11, wherein if the block size is 4, one pixel in the block at the block boundary is modified, if the block size is 8 at most two pixels in the block at the block boundary are modified, if the block size is equal to 16, up to three pixels in the block at the block boundary are modified, and if the block size is equal to 32, up to four pixels in the block at the block boundary are modified.

19. The filtering control device according to claim 11, wherein the unit configured to adjust the deblocking filtering strength is further configured to adjust the deblocking filtering strength by changing a clipping value tc based on the determined block size.

20. The filtering control device according to claim 11, wherein the unit configured to adjust a deblocking filtering strength is further configured to adjust the deblocking filtering strength by changing a threshold value, a beta parameter.

21. The filtering control device according to claim 11, wherein the filtering control device is included in one of an encoder and a decoder, for encoding or decoding video frames.

22. The filtering control device according to claim 11, wherein the filtering control device is included in a post-filter.

23. A user equipment comprising:
a memory configured to store video frames;
an encoder configured to encode said video frames into encoded video frames;
wherein said memory is further configured to store said encoded video frames; and
wherein said encoder comprises a filtering control device for applying a filter control to blocks of pixels used in encoding said video frames, wherein each video frame being encoded comprises a plurality of blocks and each pixel has a respective pixel value, and wherein the filtering control device comprises:
a unit configured to determine block size by:
determining a first block size wherein the first block size is a size associated with the block, and
determining a second block size wherein the second block size is a size associated with a neighboring block, and
determining the block size as a minimum of the first block size and the second block size,
wherein the size of the first block and the second block, respectively, is determined as a minimum of a partition size and a transform size to which the pixels on the respective side of the block boundary belong; and
a unit configured to adjust a deblocking filtering strength based on the determined block size.

24. A user equipment comprising:
a memory configured to store encoded video frames;
a decoder configured to decode said encoded video frames into decoded video frames; and
a media player configured to render said decoded video frames into video data displayable on a display;
said decoder comprising a filtering control device for applying a filter control to a block of multiple pixels of a decoded video frame, wherein the decoded video frame comprises a plurality of blocks and each pixel has a respective pixel value, and wherein the filtering control device comprises:
a unit configured to determine block size by:
determining a first block size wherein the first block size is a size associated with the block, and
determining a second block size wherein the second block size is a size associated with a neighboring block, and
determining the block size as a minimum of the first block size and the second block size,
wherein the size of the first block and the second block, respectively, is determined as a minimum of a partition size and a transform size to which the pixels on the respective side of the block boundary belong; and
a unit configured to adjust a deblocking filtering strength based on the determined block size.

25. A user equipment comprising:
a memory configured to store video frames; and
a post-filter configured to encode said video frames into encoded video frames;
wherein said memory is further configured to store said encoded video frames; and
wherein said post-filter includes a filtering control device for applying a filter control to a block of multiple pixels of a video frame, wherein the video frame comprises a plurality of blocks and each pixel has a respective pixel value, and the filtering control device comprises:
a unit configured to determine block size by:
determining a first block size wherein the first block size is a size associated with the block, and
determining a second block size wherein the second block size is a size associated with a neighboring block, and
determining the block size as a minimum of the first block size and the second block size,
wherein the size of the first block and the second block, respectively, is determined as a minimum of a partition size and a transform size to which the pixels on the respective side of the block boundary belong; and
a unit configured to adjust a deblocking filtering strength based on the determined block size.

26. A method for filter control applicable to a block of multiple pixels of a video frame, wherein the video frame comprises a plurality of blocks and each pixel has a respective pixel value, the method comprises the steps of:
determining a block size by:
determining a first block size wherein the first block size is a size associated with the block, and
determining a second block size wherein the second block size is a size associated with a neighboring block, and
determining the block size as a minimum of the first block size and the second block size,
wherein the size of the first block and the second block, respectively, is determined as a minimum of a partition size and a transform size to which the pixels on the respective side of the block boundary belong; and
adjusting a deblocking filtering strength based on the determined block size, wherein the adjustment of the deblocking filtering strength comprises modifying a number of pixels in the block at a block boundary that can be modified by deblocking filtering.

27. A filtering control device for applying a filter control to a block of multiple pixels of a video frame, wherein the video frame comprises a plurality of blocks and each pixel has a respective pixel value, the filtering control comprises:
a unit configured to determine block size by:
determining a first block size wherein the first block size is a size associated with the block, and
determining a second block size wherein the second block size is a size associated with a neighboring block, and
determining the block size as a minimum of the first block size and the second block size, wherein the size of the first block and the second block, respectively, is determined as a minimum of a partition size and a transform size to which the pixels on the respective side of the block boundary belong; and a unit configured to adjust a deblocking filtering strength based on the determined block size; and wherein the unit configured to adjust the deblocking filtering strength is further configured to adjust the deblocking filtering strength by modifying a number of pixels in the block at a block boundary that can be modified by deblocking filtering.

* * * * *